(12) United States Patent
Dilger

(10) Patent No.: US 6,281,490 B1
(45) Date of Patent: Aug. 28, 2001

(54) METHOD AND DEVICE FOR GENERATING DISTINGUISHABLE SIGNALS AND METHOD OF DISTINGUISHING SIGNALS OF SIMILAR SHAPE

(75) Inventor: Fritz Paul-Emil Dilger, Royal Oak, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 09/262,429

(22) Filed: Mar. 4, 1999

(51) Int. Cl.$^7$ ........................................ G01D 5/34
(52) U.S. Cl. ............................ 250/231.13; 180/234
(58) Field of Search ........................ 250/231.13, 231.16, 250/231.18, 231.14; 341/13; 180/233, 234; 280/12.13, 211

(56) References Cited

U.S. PATENT DOCUMENTS

| | | | |
|---|---|---|---|
| 4,833,316 | * 5/1989 | Yoneda | 250/237 G |
| 5,148,020 | * 9/1992 | Machida | 250/231.16 |
| 5,252,824 | * 10/1993 | Picanyol | 250/231.13 |

* cited by examiner

Primary Examiner—Que T. Le
(74) Attorney, Agent, or Firm—Rader, Fishman & Grauer PLLC

(57) ABSTRACT

For distinguishing two signals from different sources but with similar shapes, a signal generator offsets the signals from each other so that the values each signal assumes can be positively identified as being in permissible value ranges of one unique channel. The offset of the signals from each other is at least as large as the range of values for each channel. In this case, a mix up of channel from a signal generator to an electronic control unit can safely be detected. Also, if no positive assignment of a signal to one channel is possible, an error message can be provided. To carry out this analysis, not only the digital value of on and off of such a signal, but also the analog value, i.e. the absolute amplitude of that signal is measured for a determination of the offset. This can easily be done for two signals, but also for three or more, if only appropriate offsets are chosen.

2 Claims, 3 Drawing Sheets

METHOD AND DEVICE FOR GENERATING DISTINGUISHABLE SIGNALS AND METHOD OF DISTINGUISHING SIGNALS OF SIMILAR SHAPE

BACKGROUND OF THE INVENTION

The present invention relates to a method and device for generating distinguishable signals and a method of distinguishing signals of similar shape.

In electronic systems where two or more output channels of a signal generator are connected to two or more input channels of a receiver, for instance an electronic control unit being supplied with sensor signals, it is a common problem that the channels get mixed up due to a cross-wired connection between the signal generator and the electronic control unit. If the signals indicate different states or situations, such a mix up of channels can result in the application of inappropriate control algorithms by the electronic control unit due to faulty information.

One example for a devastating result of a cross-wired connection between such a signal generator and an electronic control unit is within an automotive vehicle, where a steering wheel sensor detects the turn of a steering wheel, i.e. the direction and the angle. During a right turn, for instance, the wheels on the right side of the vehicle are on the inner side of the curve and therefore have a shorter way to go through the curve. As a result they are supposed to be slower than the wheels on the left side of the vehicle. Should the steering angle sensor have its output channels switched and connected to the wrong input channels of the electronic control unit, then the electronic control unit would receive a faulty signal code and possibly recognize a left turn. During braking, the information about the individual wheel speeds is important for an anti-lock brake system. If the system determines that the vehicle is going through a left turn and, during braking, the wheels on the right vehicle side turn at a lower rate than on the left vehicle side, then the conclusion would be that the wheels on the right vehicle side are locking or at least have a very high wheel slip. The anti-lock control system would interfere with the braking operation, but only because of faulty information about the direction of the turn.

The object of the present invention is therefore to create a system where two signals bearing different information can be distinguished and identified in a fail-safe manner.

SUMMARY OF THE INVENTION

This object is achieved by a signal generator that is adapted to generate analog signals which are offset from each other by a specific amount that is assigned to each signal. This concept does not only apply for two channels, but also for three or more if only each signal has a specific offset from the others.

It would be especially advantageous if the offsets of the signals were larger than any permissible ranges of values so that no two signals fall into the same range. This will allow an unambiguous identification of the signal as well as a detection of a faulty signal.

The invention will be described in closer detail under consideration of the attached drawings.

DETAILED DESCRIPTION OF THE DRAWINGS

Figure 1:
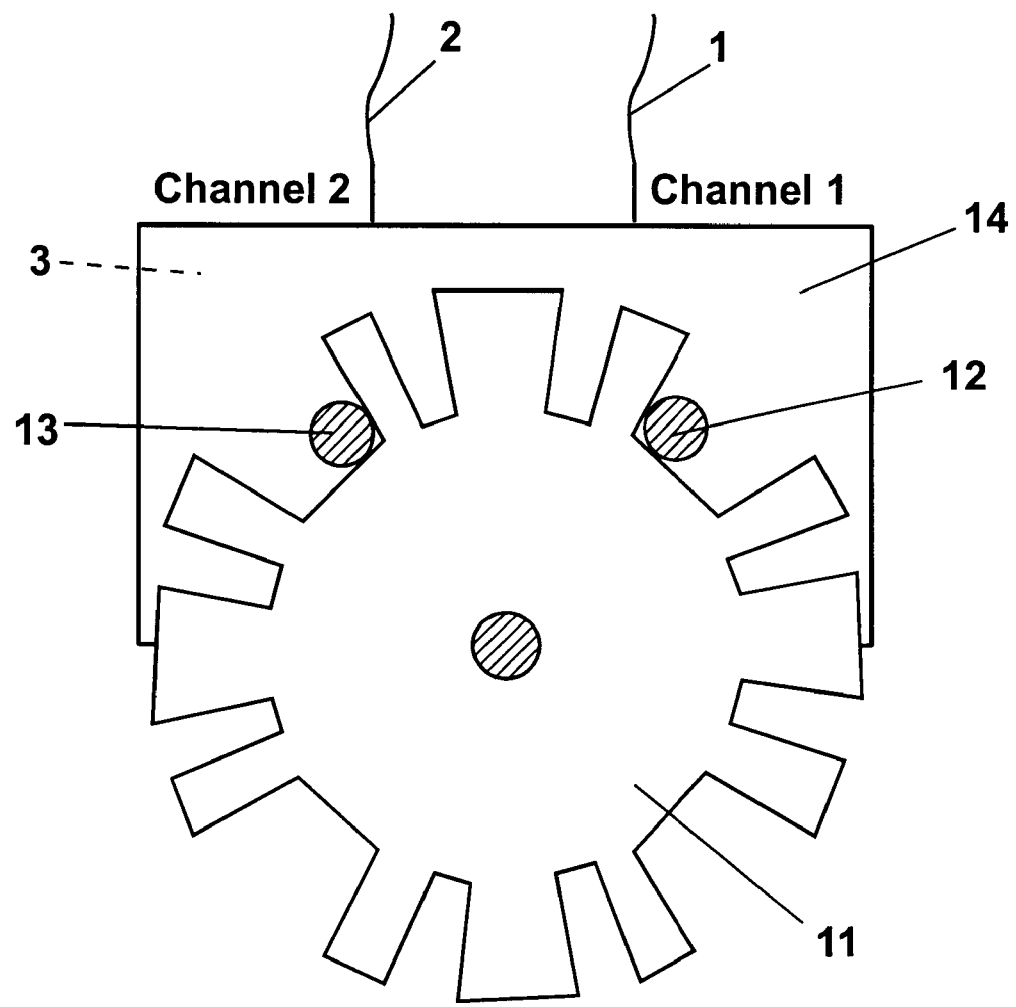
FIG. 1 shows a simple sketch of a steering angle sensor.

FIG. 1 shows a steering angle sensor in a schematic view including a toothed tone wheel 11, two optical receptors 12, and 13, and a signal generator 3, wherein the signal generator 3, along with the optical receptors 12 and 13, is integrated in a sensor housing 14. This figure is not a precise drawing of a steering angle sensor but is only used to describe the basic function on which the present invention is based. The tone wheel 11 has a periphery of alternating gaps and teeth with different widths. The two optical receptors 12 and 13 detect the light of two light sources which, in this drawing, are above the picture plane and not depicted. Submitted that the position of the tone wheel 11 as shown is a normal position for a straight course of the vehicle, where the steering wheel of the vehicle which rotates with the tone wheel 11 is at an angle zero, a left turn would cause the optical receptor 12 to be covered by a tooth of the tone wheel, while for a certain angle the optical receptor 13 would still be exposed to the light coming from the light source for it is still within a gap of the toning wheel. With changing angles of the toning wheel 11, the combination of on and off signals of the right and the left optical receptors 12 and 13 would give a code for the angular position and allow conclusions on the steering angle of the steering wheel. The signals generated by the optical receptors 12 and 13 are forwarded through two output channels 1 and 2 respectively to an electronic control unit. It may happen that the connection to the electronic control unit is cross-wired so that the signal given according to the reception of the optical receptor 12 is received at the input channel of output channel 2 instead of 1 and vice versa. As a result, an entire control algorithm can be affected by this false input.

Figure 2:
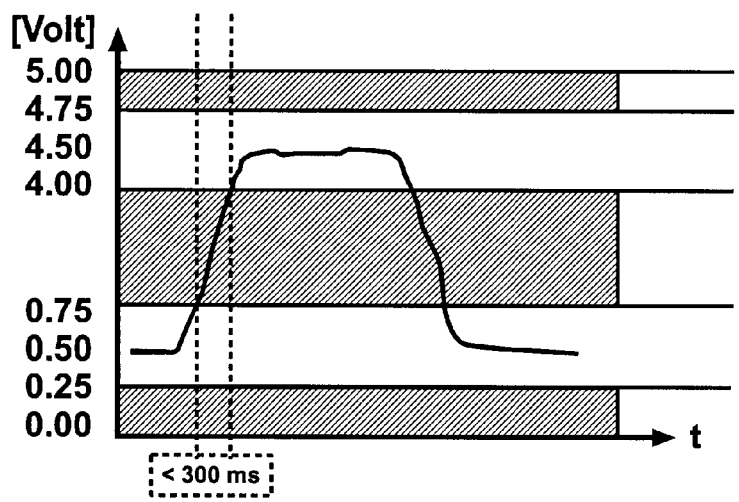
FIG. 2 shows the typical shape of signals originating from a steering angle sensor.

The shape of a typical signal generated by the signal generator 3 in accordance with the reception of one of the optical receptors 12 and 13 is depicted in FIG. 2. It is an analog signal which has an approximately rectangular shape. Depending on the position of the toning wheel, the optical receptor either receives light or it doesn't. If there is no light detected by the optical receptor, the signal assumes its low value, which in this case equals about 0.5 volts. In the case that the optical receptor is not covered by the toning wheel, it receives light from its light source, and the power of the signal generated rises up to 4.5 volts in this case. The flanks of the signal are steep so that the signal changes from its low to its high value and back within about half a second. For each, the low value and the high value, there is a permissible range of values to determine whether the sensor is functioning properly.

Figure 3:
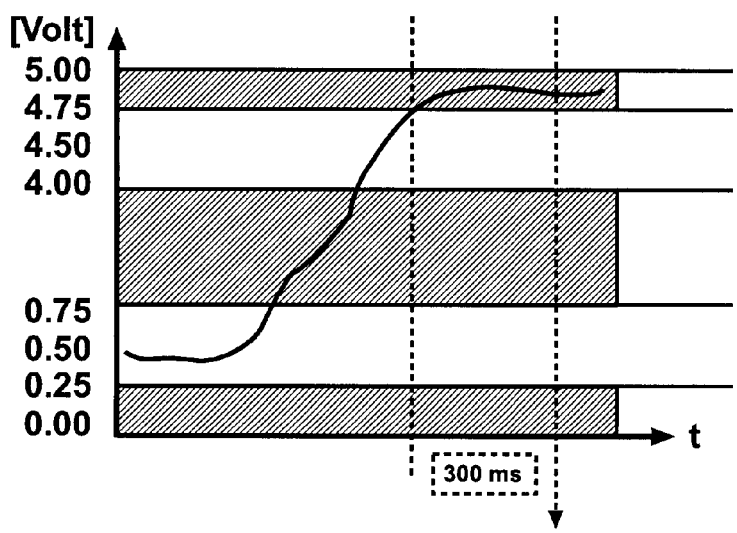
FIG. 3 shows a faulty mode where the higher one of two values of a signal is out of a preset permissible range.

FIG. 3 shows an example of an improper signal, with an upper value exceeding its permissible range. This would cause an electronic control unit to issue an error message.

Figure 4:
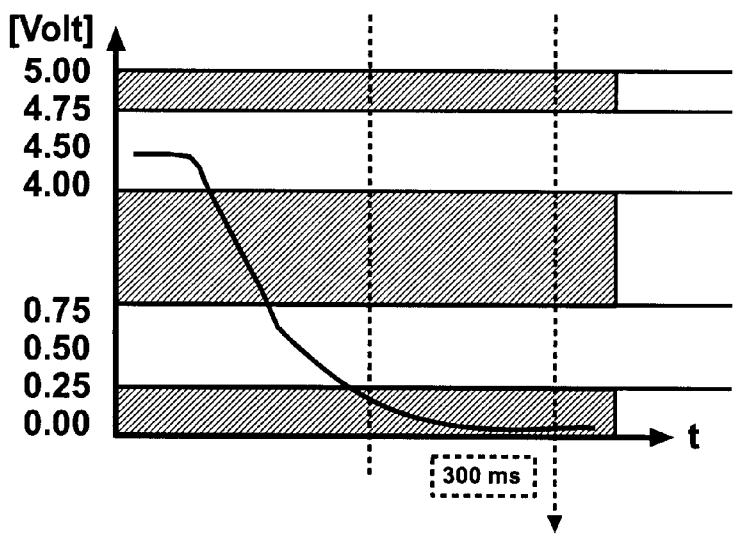
FIG. 4 shows another faulty mode where the lower one of the values is out of a permissible range.
Figure 5:
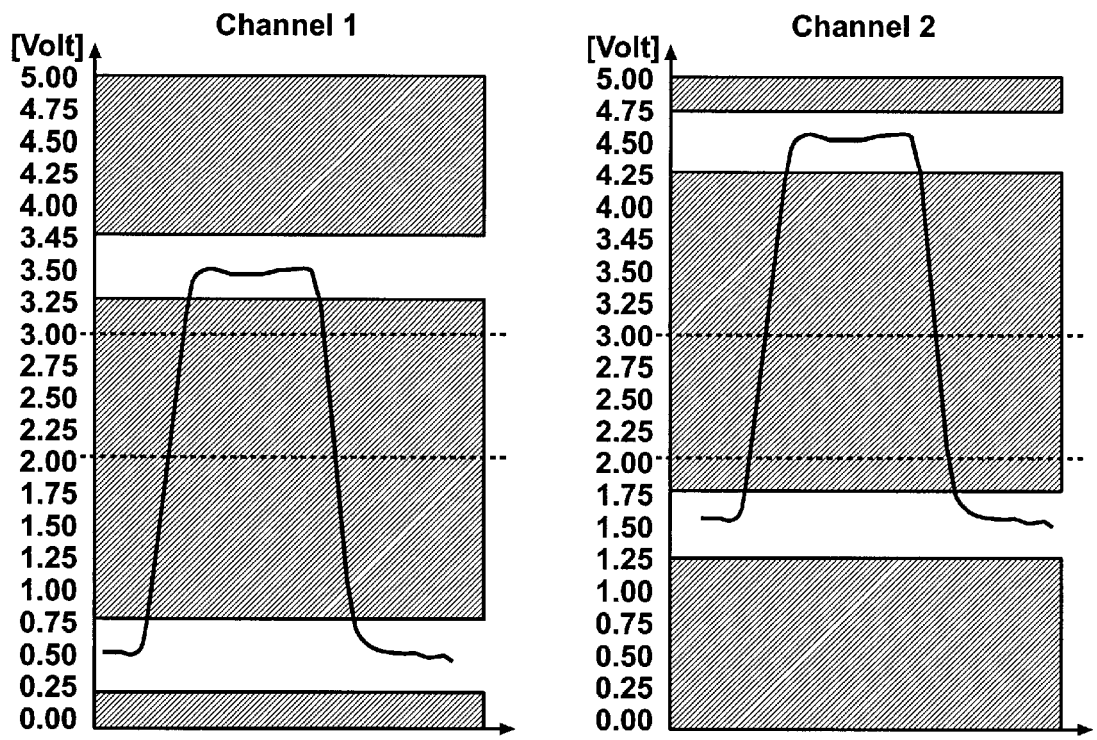
FIG. 5 shows two signals of a steering angle sensor being offset by a certain amount so that the permissible ranges of values do not overlap.

The same is true for a signal according to FIG. 4, where the lower value leaves the permissible range of values.

For a signal generator issuing two signals of a similar shape, the present invention provides two separate sets of ranges of permissible values. For channel 1, the ranges are offset from the ranges of channel 2. In the example shown, the signals of channel 1 and channel 2 as well as the ranges of permissible values are offset from each other by about 1 volt. Upper and lower value of each signal are somewhat closer together than in the example of FIG. 2. There is no overlap of the upper ranges or lower ranges between the two channels. For channel 1 the permissible ranges are 3.25 to 3.75 Volts for its upper value and 0.25 to 0.75 Volts for its lower value. The signal of channel 2 assumes 4.25 to 4.65 Volts for its upper value and 1.25 to 1.75 Volts for its lower value.

Assuming that the optical receptor 12 of FIG. 1 emits the signal on channel 1 and the optical receptor 13 of FIG. 1 emits the signal on channel 2, then there is no doubt which signal belongs to which optical receptor, even if the channels are mixed up. If a signal is received in the range between 0.25 and 0.75 volts, it is clear that it is the lower value of channel 1 whichever is the input channel of the electronic control unit processing the signals. If for instance a received value ranges between 4.25 and 4.75 volts, then it is the higher value of channel 2.

Now, it can happen that the upper and lower value cannot unambiguously be assigned to one definite channel. It may be that either the upper value or the lower value or both are not within the permissible ranges of one channel. Examples for this are that the lower value is within an permissible range of one channel but the upper values within permissible range of the other channel. Or the signals look like the examples given in FIG. 3 or 4 with respect to permissible ranges. Then an electronic control unit would notice such a discrepancy and edit a warning signal or an error message.

A recognition program in a receiver, e.g. an electronic control unit, connected to the two output channels 1 and 2 would include at least the following algorithm: the signals are scanned and compared with the valid ranges for channel 1 and channel 2. If the signal is detected in the valid ranges of channel 1, it is assigned to channel 1. If on the other hand the upper and the lower value of the signal are within the valid ranges of channel 2, the respective signal is assigned to channel 2. If the measured signal cannot positively be assigned to one single channel, an error message is generated. This error message can be an optical or an acoustical warning signal, some message on a display of a testing device, or the like.

Even though only one example has been described above, the current invention is not limited to a steering angle sensor or to only two channels. It can be any kind of sensor period whether optical or not which emits a plurality of analog signals.

What is claimed is:

1. A method of making signals from at least two different sources distinguishable from each other, including the steps of:

determining permissible value ranges for lower and upper values of said signals of each of said sources; and offsetting the signals from each of said at least two sources in such a way that said permissible ranges do not overlap each other, to thereby distinguish said signals from different sources and prevent them, if cross-wired, from being erroneously taken one for another upon processing same.

2. A steering angle optical sensor for generating distinguishable signals indicative of a direction of turning a steering wheel of a vehicle, said sensor comprising a toothed wheel rotating with said steering wheel, a first and a second optical receptor adapted to be covered by teeth of said toothed wheel upon turning thereof, said first optical receptor being located on one side and said second optical receptors being located on an opposite side of said toothed wheel relative to a zero-angle position thereof, said optical receptors being thus responsive to turning said wheel in a corresponding direction, and a signal generator controlled by either of said optical receptors to separately generate signals respectively responsive to said optical receptors, each of said signals having a lower value and an upper value, said lower value and upper value being within predetermined ranges of permissible lower and upper values, wherein said signals that are responsive to said first optical receptor are offset relative to said signals that are responsive to said second optical receptors in such a way that said predetermined ranges do not overlap each other, whereby said signals responsive to said first optical receptor are distinguishable from said signals responsive to said second optical receptor and, if cross-wired, cannot be erroneously taken one for another upon processing same.

* * * * *